US005467951A

United States Patent [19]

Young

[11] Patent Number: 5,467,951

[45] Date of Patent: Nov. 21, 1995

[54] BASEPLATE CONFIGURATION

[75] Inventor: Barry S. Young, Tualatin, Oreg.

[73] Assignee: MDT Corporation, Torrance, Calif.

[21] Appl. No.: 140,611

[22] Filed: Oct. 21, 1993

[51] Int. Cl.$^{6}$ .................................................. F16M 11/20

[52] U.S. Cl. .................................. 248/188.1; 297/344.19

[58] Field of Search ................................ 248/158, 188.1, 248/910, 127, 188.5; 297/344.19, 344.18, 344.23; D24/178

[56] References Cited

U.S. PATENT DOCUMENTS

| | | | |
|---|---|---|---|
| D. 347,065 | 5/1994 | Castellini | D24/178 |
| 519,884 | 5/1894 | Browne | 297/344.18 X |
| 562,390 | 6/1896 | Gould | 297/344.19 X |
| 668,321 | 2/1901 | Sonnex | 297/344.19 X |
| 1,228,434 | 6/1917 | Hedberg | 297/344.23 X |
| 1,731,461 | 10/1929 | Hansen | 248/188.1 X |
| 1,999,848 | 4/1935 | Ries | 297/344.19 X |
| 2,741,299 | 4/1956 | Bargen | 248/188.1 X |
| 3,188,136 | 6/1965 | Redfield | 297/344.19 X |

FOREIGN PATENT DOCUMENTS

| | | | |
|---|---|---|---|
| 1356082 | 2/1964 | France | 297/344.19 |

*Primary Examiner*—J. Franklin Foss
*Attorney, Agent, or Firm*—Trask, Britt & Rossa

[57] ABSTRACT

An ergonomically designed professional services chair baseplate that facilitates ease of operation for both the service provider and client. A narrow area is provided at the center section of the baseplate such that the baseplate does not protrude beyond the vertical projection of the edge of the chair. This narrow section is further sized and shaped to easily accommodate standard cleaning and buffing machine wheels. Enlarged areas are positioned fore and aft of the narrow section to provide stability to the chair. A sloped shoulder on each side of the aft enlarged areas may hold a chair controlling foot switch.

16 Claims, 2 Drawing Sheets

BASEPLATE CONFIGURATION

BACKGROUND OF THE INVENTION

1. Field

This invention relates generally to professional services chairs, specifically, the baseplates for such chairs. It is particularly directed to an improved baseplate for a dental patient chair.

2. State of the Art

Many personal service professions require the patient (or client) to be seated in an articulating or otherwise adjustable chair. A notable example of such a chair is a dental patient chair. The principal focus in the design of baseplates for dental patient (and other professional services) chairs has been the stability of the chair. The "footprint" of these standard baseplates has been approximately rectangular. The term "footprint" is used in this disclosure to denote the actual shape in top plan view of a baseplate. An individual is required to step over the baseplate to take a seat in the chair. It is common for the individual, especially if elderly, to stumble or trip on the baseplate when entering or leaving the chair.

In the specific case of a dental patient chair, the dentist or assistant generally sits on a stool to the rear and to one side of the chair while performing dental procedures on a patient. Some operations require the dentist to move from one side of the patient to the other, and the dentist's stool often gets caught on the projecting baseplate.

From this position, the dentist also must control the movement of the patient's chair to position the patient for the patient's comfort or for the dentist's convenience. Foot switches are commonly mounted in the dental patient chair baseplate to control the motion of the chair. However, these switches are typically uncomfortable to use or are inconveniently placed with respect to the optimum working position for the dentist. The switches must be placed towards the outer edges of the baseplate to be accessible, but in this exposed position are easily accidentally actuated at inopportune times. In some designs, a patient may accidentally actuate chair movement while entering or leaving the chair.

It has also been difficult to clean around the currently available baseplates with the cleaning, waxing, and buffing equipment commonly used in the maintenance of dental offices and operatories.

Similar difficulties are encountered by other professionals in connection with their use of professional services chairs. Accordingly, there remains a need for an improved baseplate structure for such chairs.

SUMMARY OF THE INVENTION

The present invention provides an ergonomically designed baseplate that facilitates ease of operation for both a professional services provider and the consumer of those services. Without limiting the applicability of the invention to other types of professional services chairs, it is described herein with particular reference to dental patient chairs.

According to this invention, a baseplate is constructed and arranged to preserve the stability associated with previous designs while avoiding the inconveniences inherent in those designs. The baseplate is configured such that its perimeter does not protrude beyond the edge of the chair at certain strategic locations; notably those regions where a patient will step when entering or leaving the chair. Patients may thus position themselves immediately adjacent the edge of the chair seat when entering or leaving the chair, without coming into contact with the baseplate.

Viewed axially from the top; that is, in plan view, the footprint of the baseplate inevitably includes a central region of relatively narrow transverse dimension. This central region is preferably defined by mutually opposed, shaped portions of the baseplate perimeter. Ideally, the shaped portions are concave with respect to an imaginary rectangle of minimum area which includes the footprint of the baseplate. In any event, the central region is desirably sized and shaped to accommodate the wheels of standard cleaning and buffing machines.

Structural enlargements are positioned fore and aft of the central region to provide the required stability to the associated chair. The terms "fore" and "aft" are used in this disclosure to distinguish the front from the rear of the baseplate with reference to the normal orientation of the front and back, respectively, of the chair. The enlargements are configured and arranged to present leverage arms substantially equivalent to those inherent in a conventional rectangular baseplate. They may also house foot-operated controls.

In summary, the present invention may be regarded as an improvement to a professional service chair of the type including a seat mounted atop a pedestal upstanding from a baseplate. The improvement is embodied in a baseplate comprising a central section configured so that its surface perimeter is located within the vertical projection of the edges of the chair seat. Structural enlargements, extending fore and aft from the central section, are structured and arranged to provide stable support for the pedestal. Preferably, the surface perimeter of the central section is defined by mutually opposed surfaces which are concave with respect to a reference rectangle of minimum area which contains the footprint of the base. The structural enlargements may each comprise a pair of wings, each wing constituting a leverage member, the distal ends of which are approximately congruent with the corner regions of the reference rectangle.

Each of the fore and aft enlargements may be configured as a pair of mirror image wings, each of which functions as a structural leverage component. A sloped shoulder may be provided on either or each of the aft wings to hold individual switches or a control module. In certain embodiments, the aft enlargement houses a foot switch at a convenient location and at a comfortable angle for the dentist's use. Preferably, any foot switches are positioned in a sheltered area under the back and arm of the chair. They are thus isolated against accidental actuation, either by the patient entering or leaving the chair, or by being bumped by the dentist's stool as the dentist moves from one position to another.

BRIEF DESCRIPTION OF THE DRAWING

In the drawings, which illustrate what is currently regarded as the best mode for carrying out the invention.

DETAILED DESCRIPTION OF THE ILLUSTRATED EMBODIMENT

Figure 1:
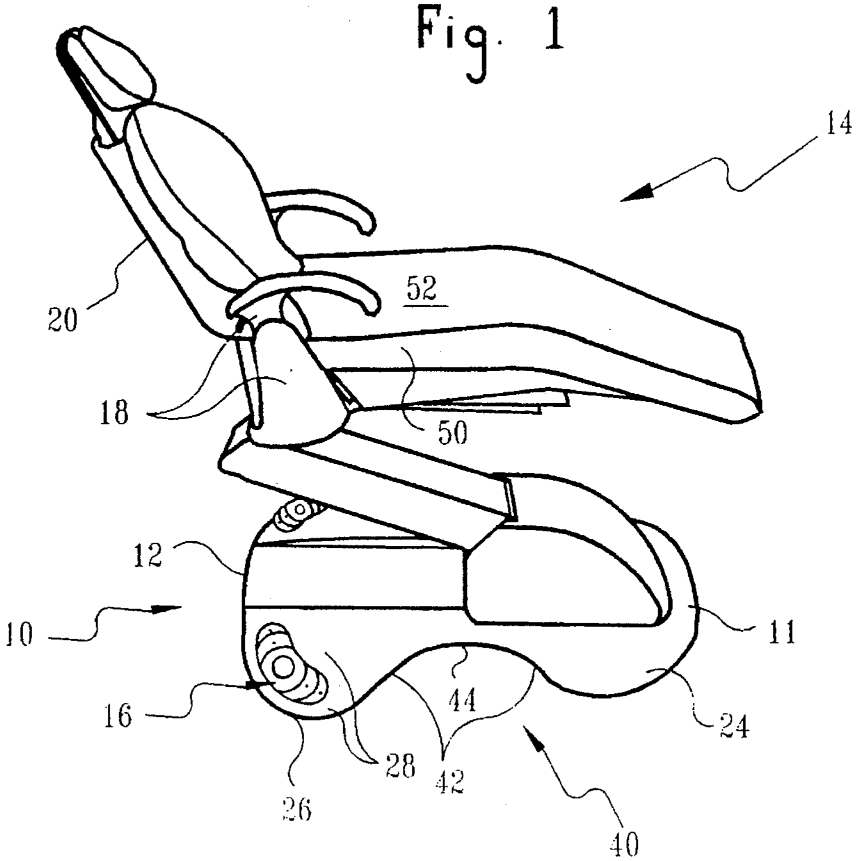
FIG. 1 is a side perspective view of a dental patient chair which includes a baseplate of the invention.
Figure 2:
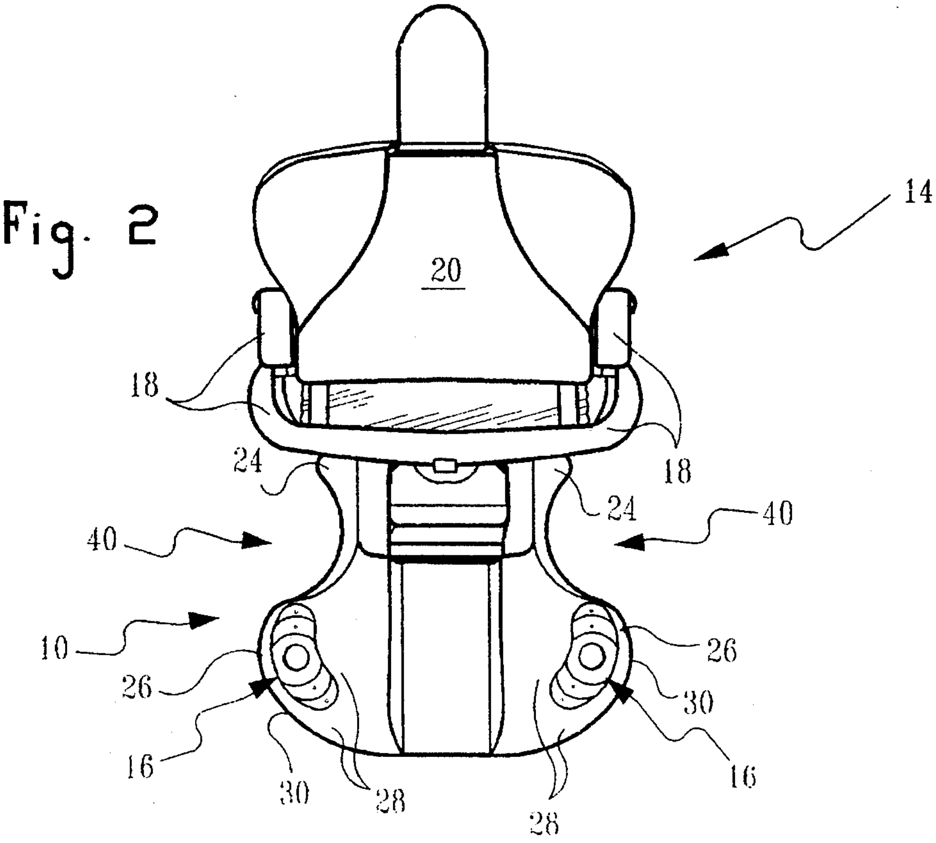
FIG. 2 is a rear perspective view of the dental patient chair of FIG. 1.
Figure 3:
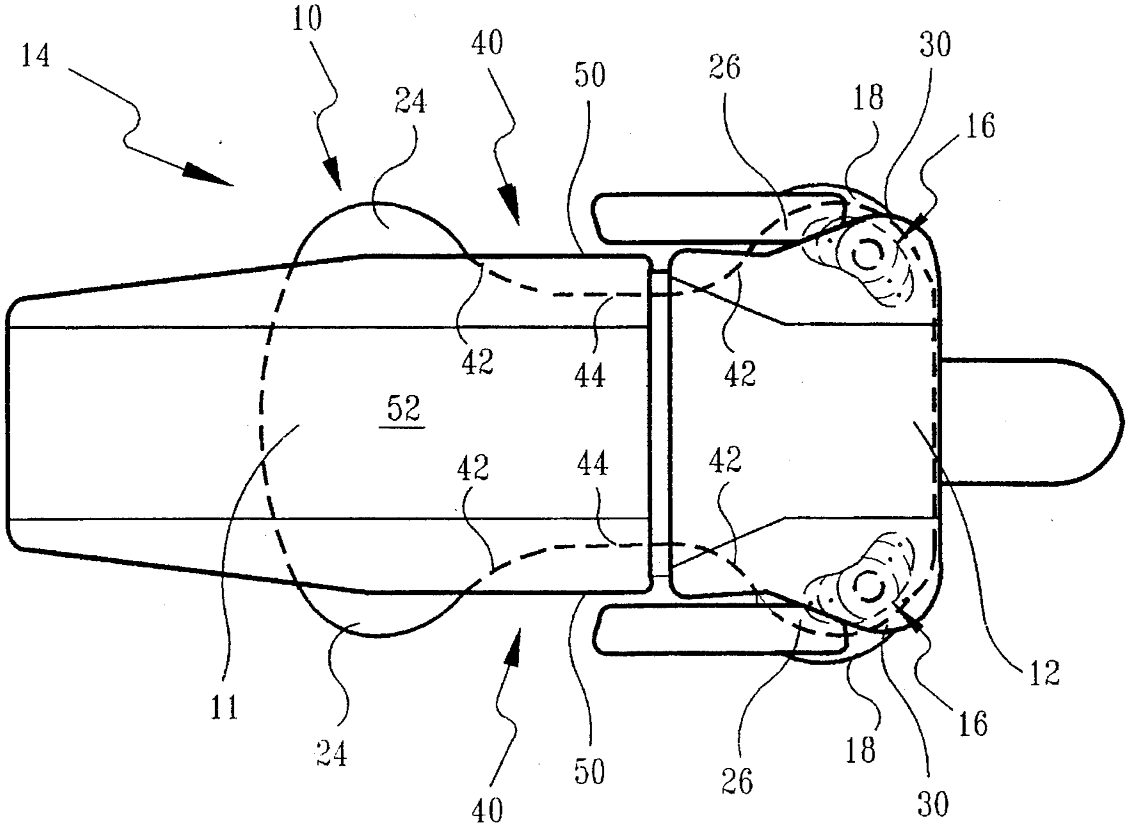
FIG. 3 is a top plan view of the dental patient chair of FIG. 1.

A baseplate 10 of the invention is shown in FIGS. 1–3. The plate 10 is shown mounted to a dental patient chair, designated generally 14. Foot switches 16 are mounted in a sheltered position under the patient chair arm assemblies 18 and chair back 20.

Referring to FIG. 1, stabilizing wings 24, 26 are provided at the front 11 and rear 12 of the baseplate 10, respectively. A foot switch 16 is located in each of the rear wings 26. Sloped shoulders 28 on the rear wings 26 hold the foot switches 16 at a comfortable angle and in a convenient location for actuation by the dentist or assistant.

In a currently preferred embodiment of the present invention, the shoulders 28 are sloped between about six and about ten degrees at the location of the foot switch 16 to minimize foot strain. The wing edges 30 are rounded to eliminate bulky protrusions from under the chair. This configuration also allows each foot switch 16 to be positioned diagonally with respect to the center line of the chair for ease of access through a full 45 degree arc around the patient's head.

Relieved portions 40 are provided at each side of the patient chair 14, as can most clearly be seen in FIGS. 2 and 3. Each such portion is sized to accommodate standard cleaning equipment. A currently preferred embodiment includes two 10 inch radii 42 spaced on a 2 inch straight section 44, which easily accommodates standard 20 inch dia. cleaning wheels. The relieved portions 40 fit under the chair so that no part of the baseplate 10 contacts a patient standing at the edge 50 of the chair seat 52 while either entering or leaving the chair 14.

Reference to the specific details of the illustrated embodiment is not intended to limit the scope of the appended claims which themselves recite those features regarded as significant to the invention. The appended claims are intended to include within their scope the illustrated embodiment and all reasonable equivalents.

What is claimed is:

1. In a professional service chair including a seat mounted atop a pedestal upstanding from a baseplate, an improved baseplate comprising:

a central section configured so that its surface perimeter is located within the vertical projection of the edges of said chair seat; and structural enlargements, extending fore and aft from said central section and being structured and arranged to provide stable support for said pedestal.

2. An improved baseplate according to claim 1, wherein said surface perimeter of said central section is defined by mutually opposed surfaces which are concave with respect to a reference rectangle of minimum area which contains the footprint of said base.

3. An improved baseplate according to claim 2, wherein said structural enlargements are each comprised of a pair of wings, each said wing constituting a leverage member, the distal ends of said wings being approximately congruent with the corner regions of said reference rectangle.

4. An improved baseplate according to claim 3, wherein said wings aft of said central section are approximately mirror images of each other and said wings fore of said central section are approximately mirror images of each other.

5. In a dental patient chair including a seat mounted atop a pedestal upstanding from a baseplate, an improved baseplate comprising:

a central section configured so that its surface perimeter is located within the vertical projection of the edges of said chair seat;

each side of said central section being concave with a radius of curvature selected to accommodate standard floor cleaning equipment; and structural enlargements extending fore and aft from said central section and structured and arranged to provide stable support for said pedestal.

6. A baseplate according to claim 5, wherein each said structural enlargement further comprises:

a pair of wings, each said wing constituting a leverage member, the distal ends of said wings being approximately congruent with the corner regions of a reference rectangle of minimum area which contains the footprint of said base;

wherein said wings aft of said central section are approximately mirror images of each other and said wings fore of said central section are approximately mirror images of each other.

7. A baseplate according to claim 6, wherein each said aft wing further comprises:

a curved shoulder area at each said distal end, each said curved shoulder area being structured and arranged so that its surface perimeter is located within the vertical projection of the chair back and/or arm assembly edges of said dental patient chair.

8. A baseplate according to claim 6, wherein each said aft wing further comprises:

a slope at each said distal end of each said aft wing, each said slope structured and arranged to carry a foot switch at a predetermined ergonomically efficient angle.

9. In a dental patient chair including a seat mounted atop a pedestal upstanding from a baseplate, an improved baseplate comprising:

a central section configured so that its surface perimeter is located within the vertical projection of the edges of said chair seat, said central section being defined by two radii of curvature spaced on a straight section at each side of said central section, whereby each side of said central section is sized to accommodate standard floor cleaning equipment; and structural enlargements, extending fore and aft from said central section and being structured and arranged to provide stable support for said pedestal.

10. A baseplate according to claim 9, wherein said radii of curvature are approximately 10 inches in length.

11. A baseplate according to claim 9, wherein each said structural enlargement further comprises:

a pair of wings, each said wing constituting a leverage member, the distal ends of said wings being approximately congruent with the corner regions of a reference rectangle of minimum area which contains the footprint of said base; wherein said wings aft of said central section are approximately mirror images of each other and said wings fore of said central section are approximately mirror images of each other.

12. A baseplate according to claim 11, further including a curved edge and sloped shoulder area at each said distal end of each said aft wing, one or more said shoulder area carrying a chair control foot switch, and each said curved edge structured and arranged so that its surface perimeter is located within the vertical projection of the chair back and/or arm assembly edges of the dental patient chair.

13. A baseplate according to claim 12, wherein each said shoulder area on each said aft wing carrying a chair control foot switch holds each said foot switch at an approximately 6–10 degree angle to the floor surface.

14. The combination of a dental patient chair mounted on a substantially hourglass-shaped baseplate comprising:

a narrower central section;

wider sections fore and aft of said central section; and a pedestal mounting said chair to said base, wherein said pedestal is mounted in said base such that the point of patient entry onto the seat of said chair is placed over said narrower central section of said hourglass-shaped base and said central section is further structured and arranged so that its surface perimeter is located within the vertical projection of the edges of said chair seat.

15. The combination of claim 14, further comprising at least one chair controlling foot switch mounted in said baseplate.

16. The combination of claim 14, further comprising:

at least one radius of curvature at each side of said central section of said base, whereby said central section is sized to accommodate standard floor cleaning equipment.

* * * * *